(12) United States Patent
Wang et al.

(10) Patent No.: US 7,798,681 B2
(45) Date of Patent: Sep. 21, 2010

(54) LIGHT GUIDE BLOCK AND RELATED ILLUMINATION DEVICE AND BACKLIGHT MODULE HAVING THE SAME

(75) Inventors: Meng-Hua Wang, Miao-Li Hsien (TW); Mei-Jiun Lin, Miao-Li Hsien (TW); An-Chi Wei, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 25 days.

(21) Appl. No.: 12/048,657

(22) Filed: Mar. 14, 2008

(65) Prior Publication Data

US 2009/0046468 A1 Feb. 19, 2009

(30) Foreign Application Priority Data

Aug. 14, 2007 (CN) .................. 2007 1 0201356

(51) Int. Cl.
*F21V 11/00* (2006.01)
*F21V 5/00* (2006.01)

(52) U.S. Cl. .................. 362/351; 362/335; 362/338

(58) Field of Classification Search ......... 362/326–340, 362/242, 244, 246, 310, 356
See application file for complete search history.

(56) References Cited

U.S. PATENT DOCUMENTS

| | | | |
|---|---|---|---|
| 5,197,792 A | 3/1993 | Jiao et al. | |
| 6,097,549 A * | 8/2000 | Jenkins et al. | 359/726 |
| 6,612,722 B2 | 9/2003 | Ryu et al. | |
| 6,951,415 B2 * | 10/2005 | Amano et al. | 362/520 |
| 7,021,805 B2 * | 4/2006 | Amano et al. | 362/518 |

FOREIGN PATENT DOCUMENTS

| | | |
|---|---|---|
| CN | 1470799 A | 1/2004 |
| FR | 2841966 A1 | 1/2004 |
| JP | 2003-344662 A | 12/2003 |
| TW | 573739 | 1/2004 |
| TW | 200714980 | 4/2007 |
| WO | WO2006085526 A1 | 8/2006 |

OTHER PUBLICATIONS

Chen et al., Sequential Color LED Backlight Driving System for LCD Panels, IEEE Transactions on Power Electronics, vol. 22, No. 3, May 2007.

* cited by examiner

*Primary Examiner*—Hargobind S Sawhney
(74) *Attorney, Agent, or Firm*—Andrew C. Cheng

(57) ABSTRACT

A backlight module (300) includes a plurality of illumination devices (100). Each of the illumination devices includes a light guide block (120) and a point light source (140) optically coupled with the light guide block. The light guide block includes a light exit surface (121), a bottom surface (123) opposite to the light exit surface, and a tapered portion (122) located between the light exit surface and the bottom surface. The bottom surface has a receiving hole (1232) formed therein. The tapered portion includes an outside surface (1221) and a prism array (1224) formed on the outside surface. The point light source is secured in the receiving hole. The plurality of illumination devices are joined with one another and the light exit surfaces of light guide blocks are substantially coplanar and whereby cooperatively constitute a light output surface of the backlight module.

11 Claims, 11 Drawing Sheets

US 7,798,681 B2

LIGHT GUIDE BLOCK AND RELATED ILLUMINATION DEVICE AND BACKLIGHT MODULE HAVING THE SAME

BACKGROUND

1. Technical Field

The present invention generally relates to illumination devices for illuminating non-emissive displays, such as LCD displays, floor mats, and large-size logo display boards and, particularly to an illumination device uniformly guides input light onto its top surface thereof.

2. Description of Related Art

Non-emissive display devices such as LCD panels, floor mats, or logo display boards are commonly used in daily life. External light sources are applied in the display devices for providing illuminations for the non-emissive display devices. LED (light emitting diode) is preferably used in the non-emissive display devices instead of CCFLs (cold cathode fluorescent lamp) due to its brightness, long life-span, and wide color gamut. This is disclosed in IEEE Transactions on Power Electronics, Vol. 22, No. 3, entitled "Sequential Color LED Backlight Driving System for LCD Panels", and published by Chen et al. in May 2007, the disclosure of which is incorporated herein by reference.

A typical illumination device includes a light guide block and an array of point light sources. Lights emitted from the point light sources are converted into a surface light and provide illuminations for the non-emissive display devices. However, a radiation angle of each of the point light sources is usually less than 120°, which induces a peripheral portion of the display devices to be darker than a central portion thereof. This causes the light to non-uniformly distribute over the display devices. Therefore, there is a need for improving the display efficiency of the display devices.

SUMMARY

The present invention, in one aspect, provides a light guide block for an illumination device. The light guide block includes a light exit surface, a bottom surface opposite to the light exit surface and a tapered portion located between the light exit surface and the bottom surface. The bottom surface has a receiving hole configured for receiving a light source therein. The tapered portion includes an outside surface and a prism array formed on the outside surface. The light emitted from a light emitting diode (LED) of the illumination device is spread out and refracted due to the configuration of the tapered portion and the prism array of the tapered portion. Therefore, the light is uniformly distributed over the light exit surface of the light guide block.

The present invention, in another aspect, provides an illumination device. The illumination device includes a light guide block and a point light source optically coupled with the light guide block. The light guide block includes a light exit surface, a bottom surface opposite to the light exit surface and a tapered portion located between the light exit surface and the bottom surface. The bottom surface has a receiving hole formed therein. The tapered portion includes an outside surface and a prism array formed on the outside surface. The point light source is securely received in the receiving hole of the bottom surface. The light emitted from the light source is spread out and refracted due to the configuration of the tapered portion and the prism array of the tapered portion. Therefore, the light is uniformly distributed over the light exit surface of the light guide block.

The present invention, in further respect, provides a backlight module. The backlight module includes a plurality of illumination devices. Each of the illumination devices includes a light guide block and a point light source optically coupled with the light guide block. The light guide block includes a light exit surface, a bottom surface opposite to the light exit surface and a tapered portion located between the light exit surface and the bottom surface. The bottom surface has a receiving hole formed therein. The tapered portion includes an outside surface and a prism array formed on the outside surface. The point light source is securely received in the receiving hole. The plurality of illumination devices are joined with one another and the light exit surfaces of light guide blocks are substantially coplanar and cooperatively constitute a light output surface of the backlight module. The size and shape of the backlight module can be changed due to change of the amount and shapes of the light guide blocks, which compos the backlight module, so as to meet the size and shape requirement of the display without downgrading the uniformity.

Other advantages and novel features of the present light guide block, illumination device and backlight module will become more apparent from the following detailed description of preferred embodiments when taken in conjunction with the accompanying drawings, in which:

DETAILED DESCRIPTION OF THE INVENTION

Figure 1:
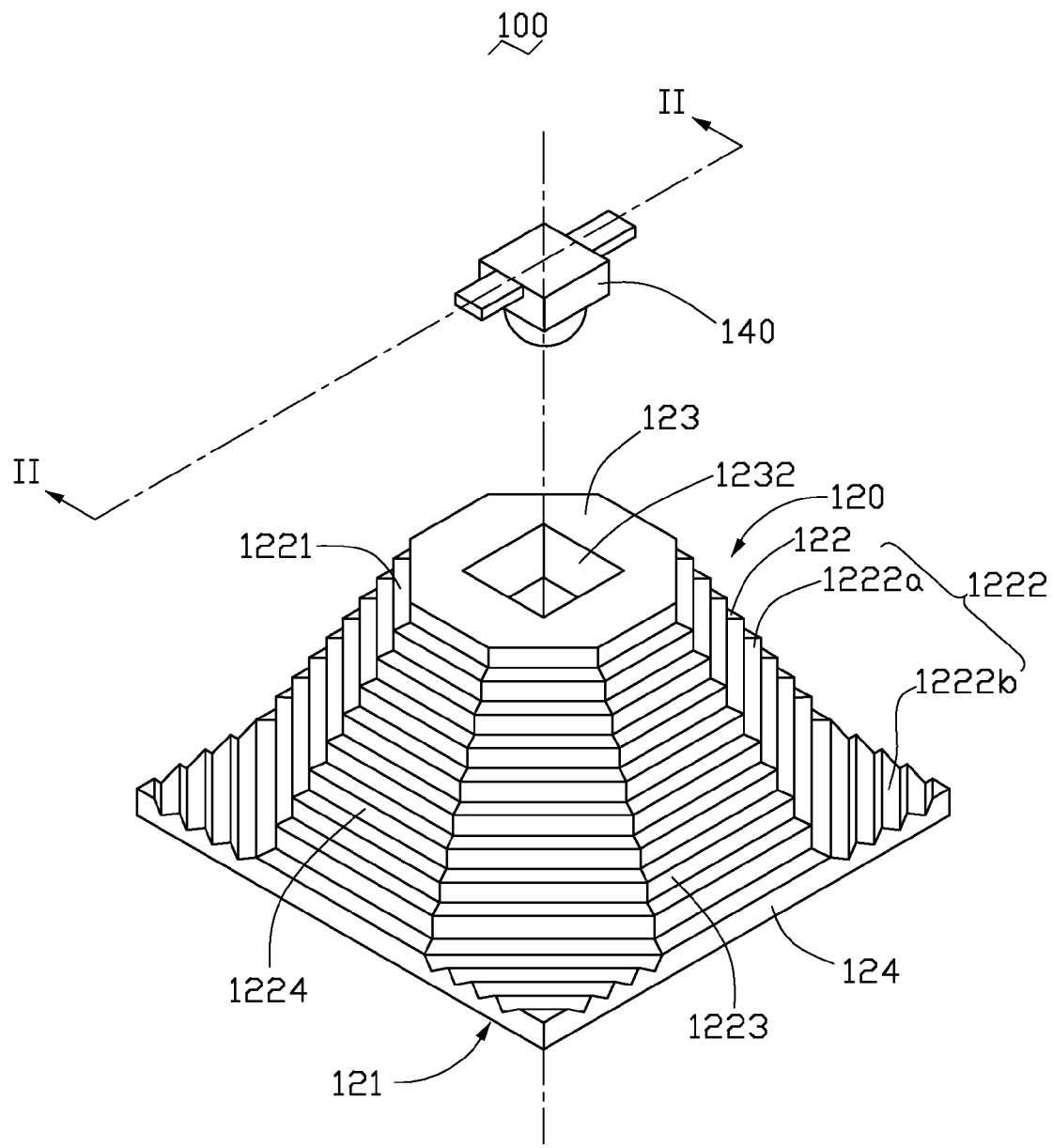
FIG. 1 a schematic, perspective exploded upside down view of an illumination device, according to a first present embodiment.

Reference will now be made to the drawing figures to describe the various present embodiments in detail.

Figure 2:
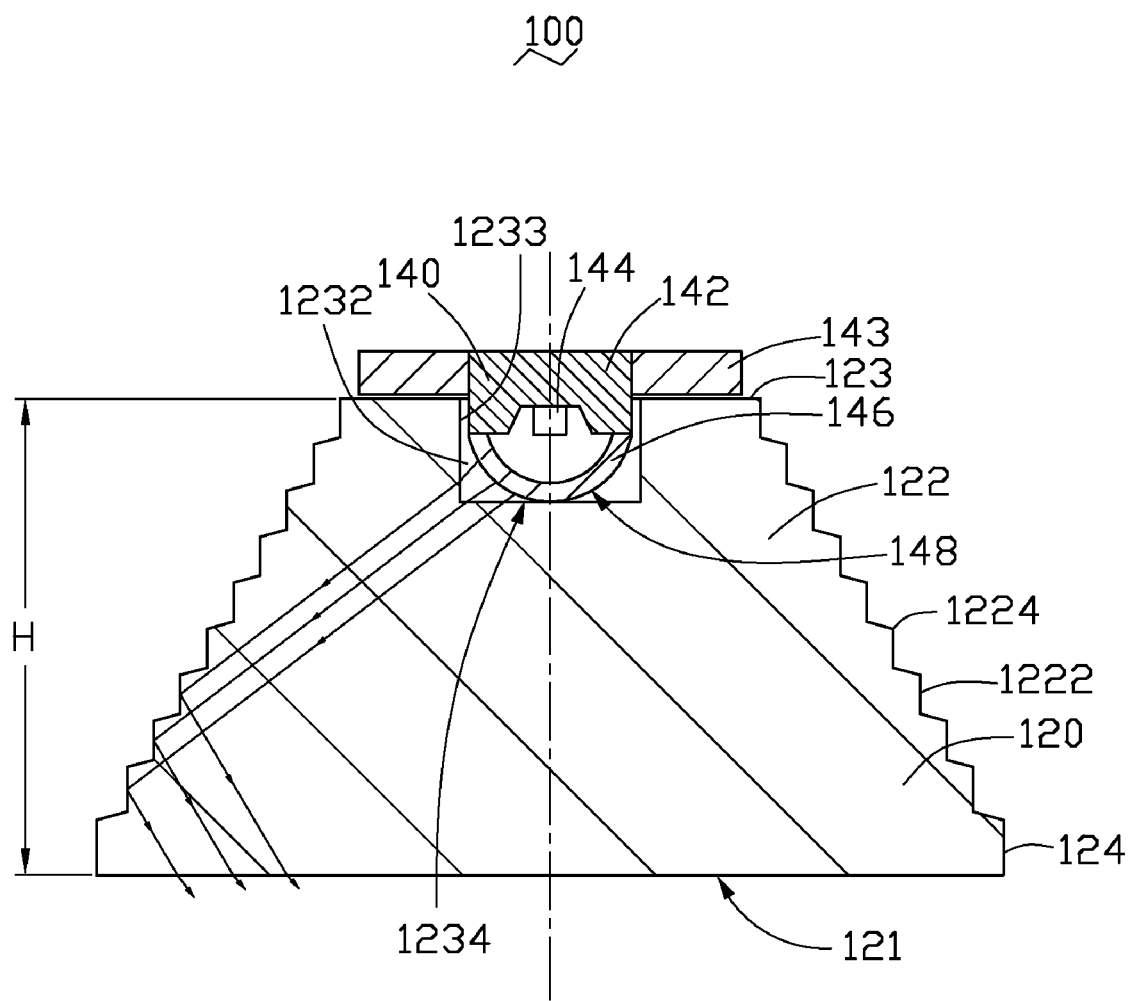
FIG. 2 is a schematic, cross sectional view of the illumination device of FIG. 1, taken along line II-II thereof.
Figure 3:
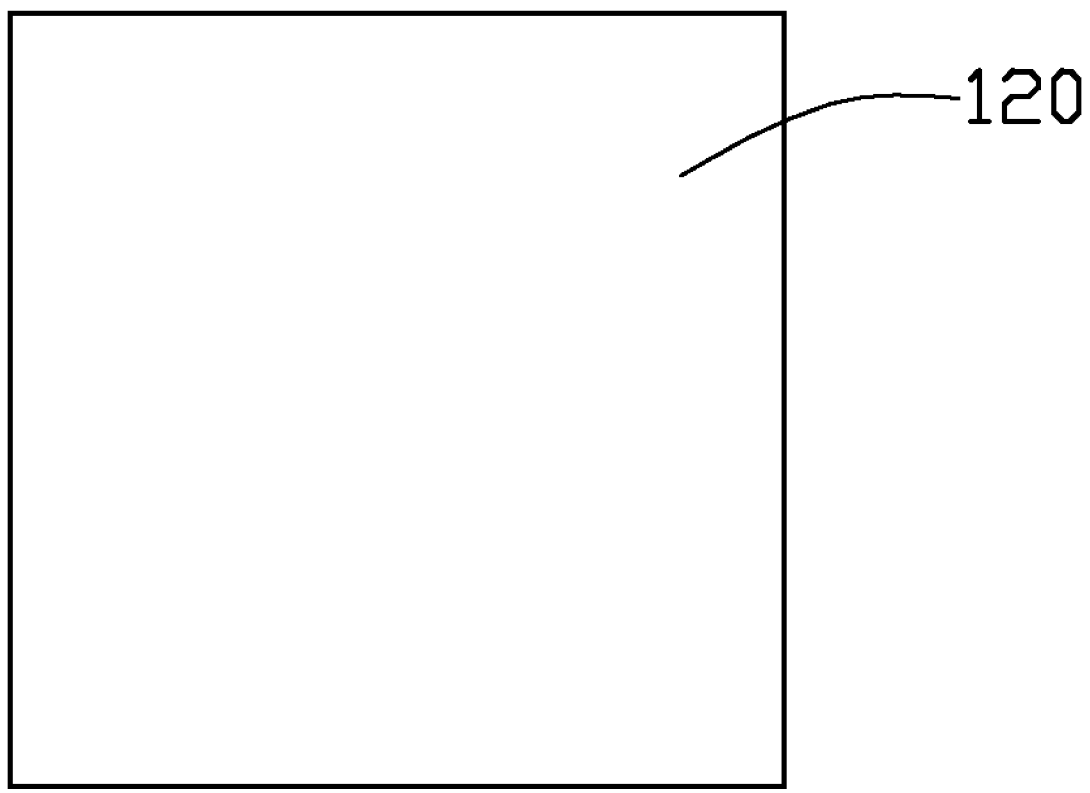
FIG. 3 is a schematic, bottom view of the illumination device of FIG. 1.

Referring to FIGS. 1 and 2, an illumination device 100, according to a first present embodiment, is provided. The illumination device 100 includes a light guide block 120 and a point light source (not shown) optically coupled with and facing toward the light guide block 120. In this embodiment, the point light source is a LED (light emitting diode) 140, such as a semiconductor LED or an OLED (organic light emitting diode).

The light guide block 120 includes a substantially rectangular shaped planar light exit surface 121, an octagon bottom surface 123 opposite to the light exit surface 121, and a tapered portion 122 interconnecting the light exit surface 121 and the bottom surface 123. A diameter of the tapered portion 122 gradually decreases along a direction oriented from the light exit surface 121 towards the bottom surface 123. That is, the light guide block 120 tapers from the light exit surface 121 to the bottom surface 123. A joint surface 124 is formed between the light exit surface 121 and a periphery stepped side surface 1221 of the tapered portion 122 and configured for jointing the light guide block 120 with an adjacent light guide block 120. In this embodiment, there are four joint surfaces 124 formed between the light exit surface 121 and the periphery stepped side surface 1221 of the tapered portion 122. The light guide block 120 defines a blind and rectangular shaped receiving hole 1232 in the bottom surface 123. The LED 140 is securely received in the receiving hole 1232 of the light guide block 120 so that the LED 140 and the light guide block 120 is assembled together. The receiving hole 1232 is, preferably, defined in a central portion of the bottom surface 123 so that LED 140 can be centered on a geometrical center line (the broken line of FIG. 1) of the light guide block 120. Alternatively, the LED 140 can deviate from the geometrical center line of the light guide block 120, by a small offset. Side surfaces 1233 surrounding the receiving hole 1232 are configured as concaved surfaces so as to reduce internal reflection of the light incident emitted from the LED 140 thereon. A prism array 1224 is formed on the periphery stepped side surface 1221 of the tapered portion 122 and is symmetrically opposite disposed around the geometrical center line of the light guide block 120.

The tapered portion 122 is octagon pyramid in profile and the periphery stepped side surface 1221 of the tapered portion 122 includes first side surfaces 1223 and second side surfaces 1222. The first side surfaces 1223 has four sides thereof respectively connect between middle portions of sides of the rectangular light exit surface 121 and four spaced sides of the octagon bottom surface 123. The second side surfaces 1222 has four sides thereof respectively connect between corners of the rectangular light exit surface 121 and the other four sides of the octagon bottom surface 123. Each of the second side surfaces 1222 has a substantially isosceles trapezoid top portion 1222a which connects with adjacent first side surfaces 1223 and a substantially triangle shaped bottom portion 1222b corresponding to the corners of the light exit surface 121. The first side surfaces 1223 are substantially isosceles trapezoid shaped in profile and have the same vertex angles and base angles as the top portions 1222a of the second side surfaces 1222. The first side surfaces 1223 and the top portions 1222a of the second side surfaces 1222 slantingly extend from the light exit surface 121 towards the bottom surface 123. Elevation angles of the first side surfaces 1223 are substantially equal to that of the top portions 1222a of the second side surfaces 1222. In this embodiment, the first side surfaces 1223 have different configurations with the second side surfaces 1222.

The first and second side surfaces 1222, 1223 of the tapered portion 122 are step shaped in profile and each includes a plurality of steps. Corresponding steps of the first side surfaces 1223 and the top portions 1222a of the second side surfaces 1222 cooperatively form a ring-shaped prism. The ring-shaped prism has an octagon shaped configuration. The tapered portion 122 of the light guide block 120 comprises of a plurality of ring-shaped prisms. The ring-shaped prisms are continuously connected from the light exit surface 121 towards the bottom surface 123 of the light guide block 120. Alternatively, the ring-shaped prisms can be discretely connected from the light exit surface 121 towards the bottom surface 123 of the light guide block 120. The ring-shaped prisms cooperatively form the tapered portion 122 of the light guide block 120. A diameter of the ring-shaped prisms of the light guide block 120 gradually decreases from the light exit surface 121 towards the bottom surface 123. The joint surface 124 is formed between the light exit surface 121 and the bottommost ring-shaped prism.

Particularly referring to FIG. 2, the LED 140 includes a substrate 142, a LED chip 144 and an arc shaped transparent encapsulation 146. A sealed room (not shown) is formed between the substrate 142 and the transparent encapsulation 146, and configured for receiving the LED chip 144 therein. A light emitting surface 148 is formed on an outside surface of the transparent encapsulation 146 which faces away from the LED chip 144. A pair of electrodes 143 is arranged on the substrate 142 for supplying power to the LED chip 144.

In this embodiment, the LED 140 has one LED chip 144 such as a blue LED chip or a green LED chip. A layer of fluorescence material is disposed between the transparent encapsulation 146 and the LED chip 144. The fluorescence material can also be directly mixed into the transparent encapsulation 146, and creates a white light. Alternatively, the LED 140 may include more than one LED chip 144. For instance, the LED 140 includes three LED chips 144 such as a red LED chip, a green LED chip and a blue LED chip. The light emitted by these LED chips 144 can be mixed together to achieve a white light. Accordingly, there is no need to disposed fluorescence material in the LED 140. Further, the LED 140 is not limited to the white LED, and may include one or more monochromatic light LED chips 144 such as red LED chips, orange color LED chips, yellow LED chips, purple LED chips, green LED chips, or etc., so as to obtain monochromatic light.

In the present illumination device 100, the light emitting surface 148 of the LED 140 is arranged in the receiving hole 1232 of the light guide block 120. The electrodes 143 of the LED 140 are disposed at one side of the bottom surface 123 of the light guide block 120. Furthermore, the electrodes 143 of the LED 140 are, preferably, exposed outside of the receiving hole 1232 and above the bottom surface 123 of the light guide block 120 so that the electrodes 143 can easily be connected to external circuits (not shown). In this embodiment, the LED 140 is preferred to be a side-emitting LED whose light intensity distribution is substantially batwing shaped, in such that bright spots can be prevented from appearing in the central area of the light exit surface 121 of the light guide block 120.

In operation of the illumination device 100, the light emitted from the light emitting surface 148 of the LED 140 transmits through the side surfaces 1233 and a bottom surface 1234 of the receiving hole 1232 and enters into the light guide block 120. The light emitted from the LED 140 is spread out due to the shape of the tapered portion 122 and is re-directed by the prism array 1224 of the tapered portion 122. Finally, the light is uniformly distributed over the light exit surface 121 of the light guide block 120 and guided out of the illumination device 100 from the light exit surface 121. Therefore, the light guide block 120 has better light distribution performance.

In the present illumination device 100, a thickness H of the light guide block 120 is no more than 1 centimeter (cm), whilst an area of the light exit surface 121 of the light guide block 120 is no less than 10 times 10 square centimeters ($cm^2$), such as 10 times 10 square centimeters, 15 times 15 square centimeters, 20 times 20 square centimeters. The light emitted from the LED 140 is uniformly distributed over the light exit surface 121 of the light guide block 120, which has a larger area, while the light guide block 120 has thin configuration. Therefore, the light guide block 120 has high performance in light distribution but compact in size and lower cost.

In the present light guide block 120, the tapered portion 122 is octagon pyramid in profile. Alternatively, the configuration of the tapered portion 122 of the light guide block 120 can be conic-shaped with a round radial cross section, or other multi-pyramids with equilateral multi-polygon radial cross sections. Accordingly, the configuration of the ring-shaped prisms can be rounded, or other equilateral multi-polygon shaped.

Figure 4:
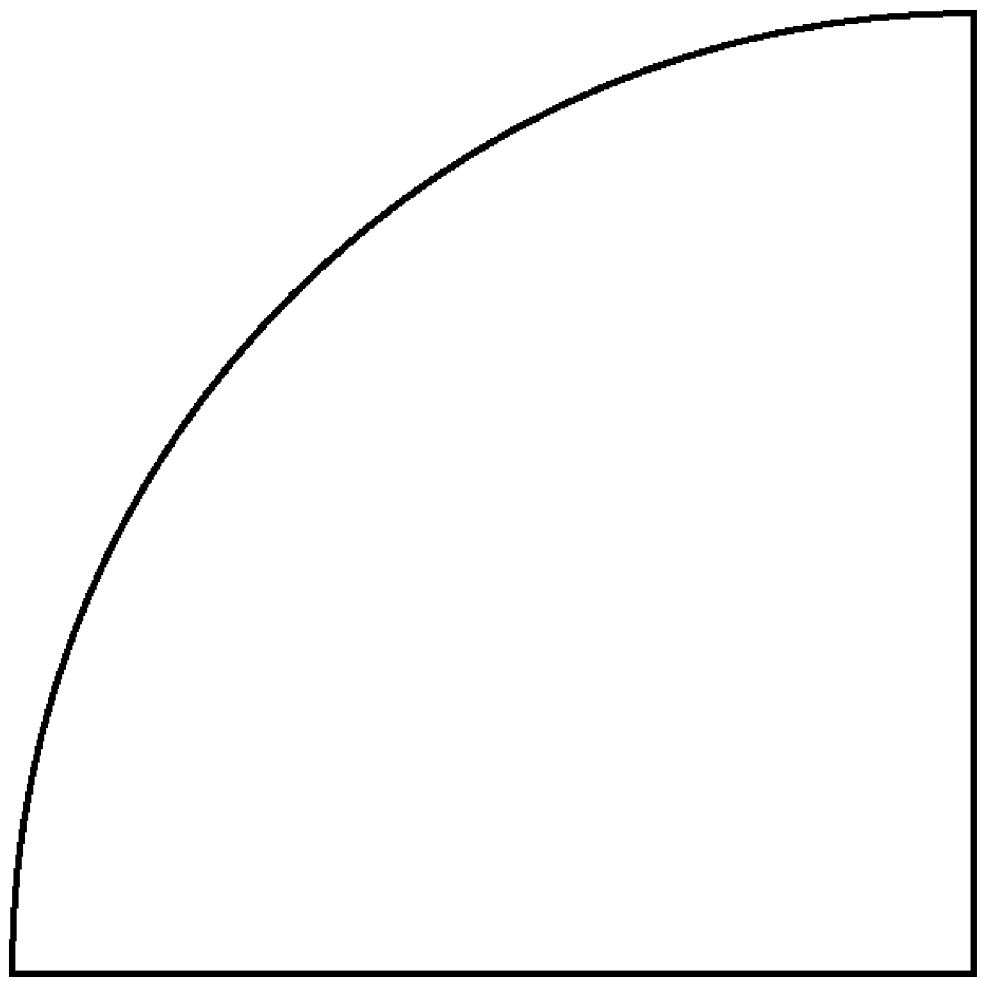
FIGS. 4 through 6 respectively are schematic, bottom views of illumination devices, according to other present embodiments.
Figure 5:
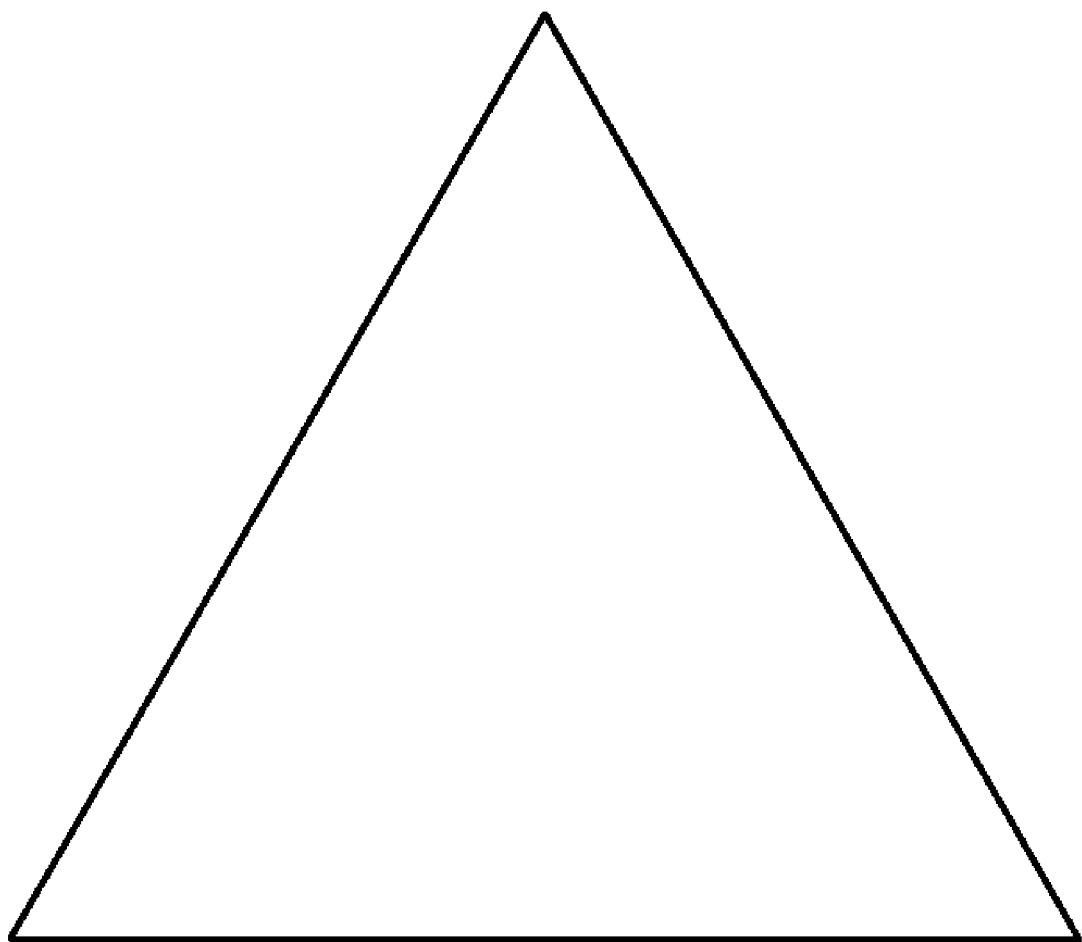
Figure 6:
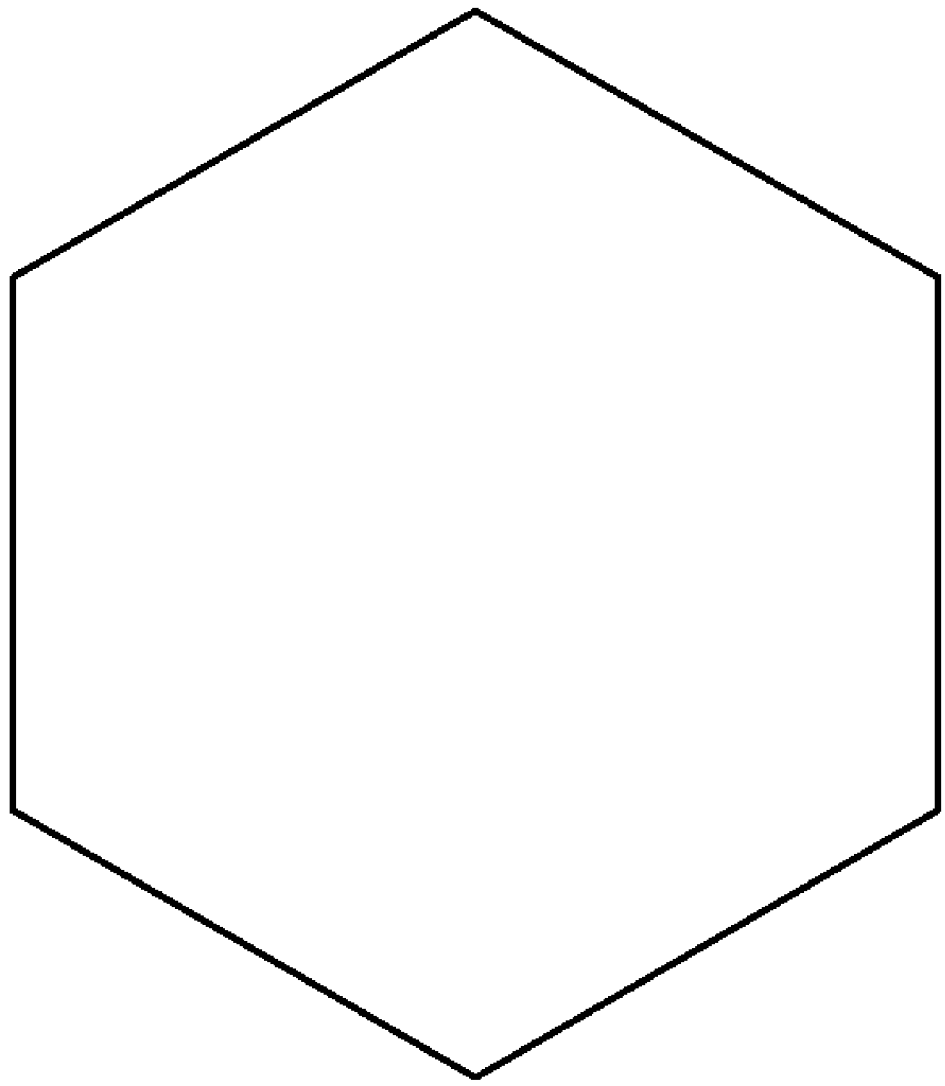

In the present light guide blocks 120, the light exit surface 121 is rectangular shaped in profile. Alternatively, the light exit surface 121 of the light guide block 120 may have other configurations, such as a quarter round, (right-angled sector) shaped configuration (shown in FIG. 4), a triangle shaped configuration (e.g., an equilateral, triangle shaped configuration, as shown in FIG. 5), a hexagon shaped configuration (shown in FIG. 6), or other polygon shaped configurations.

Figure 7:
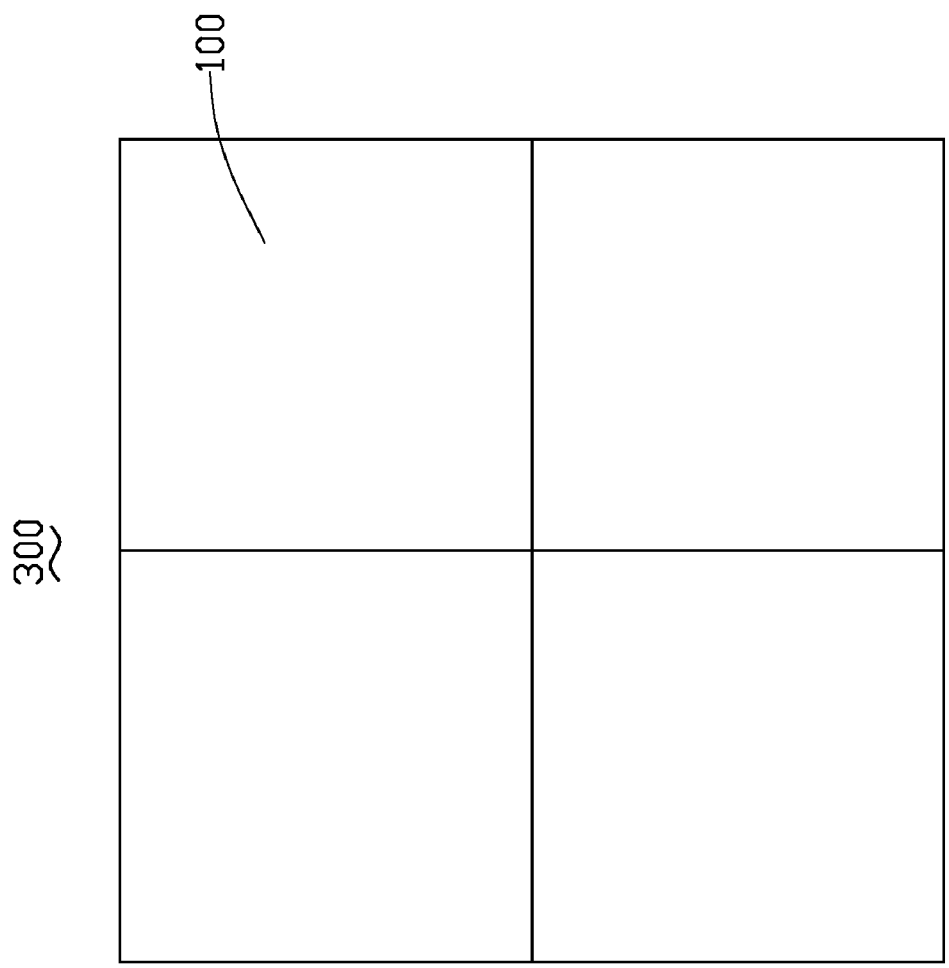
FIG. 7 a schematic, bottom view of an backlight module, according to a second present embodiment.
Figure 8:
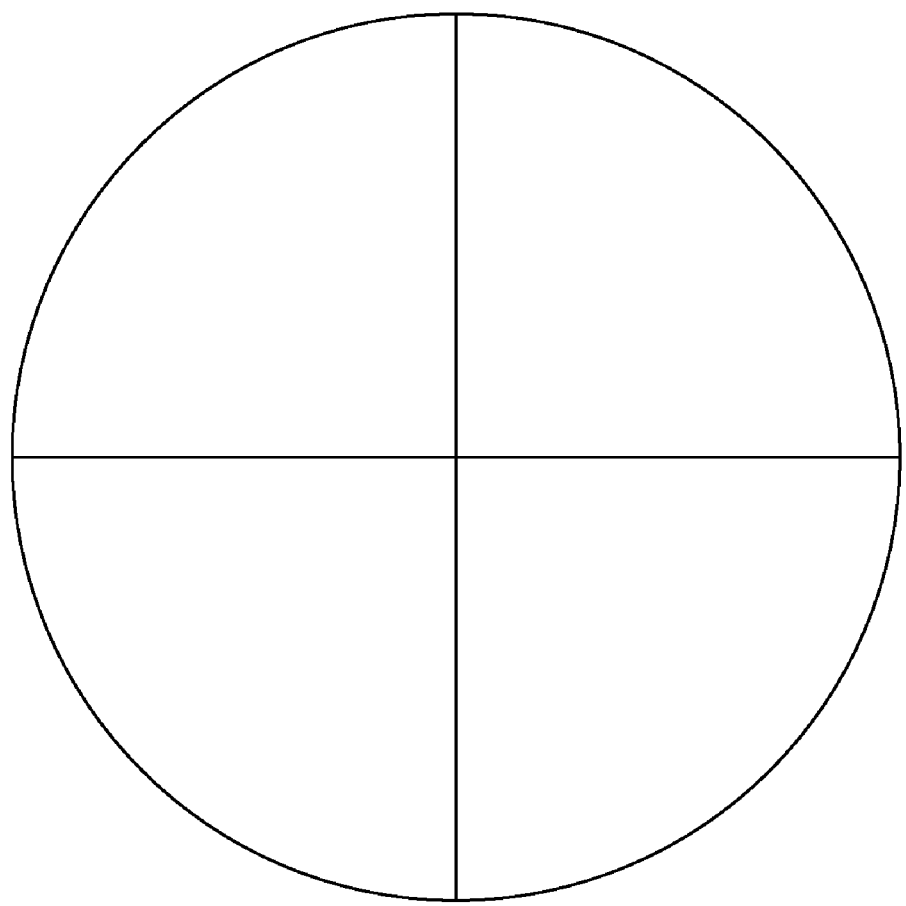
FIGS. 8 through 11 respectively are schematic, bottom views of backlight module, according to other present embodiments.
Figure 9:
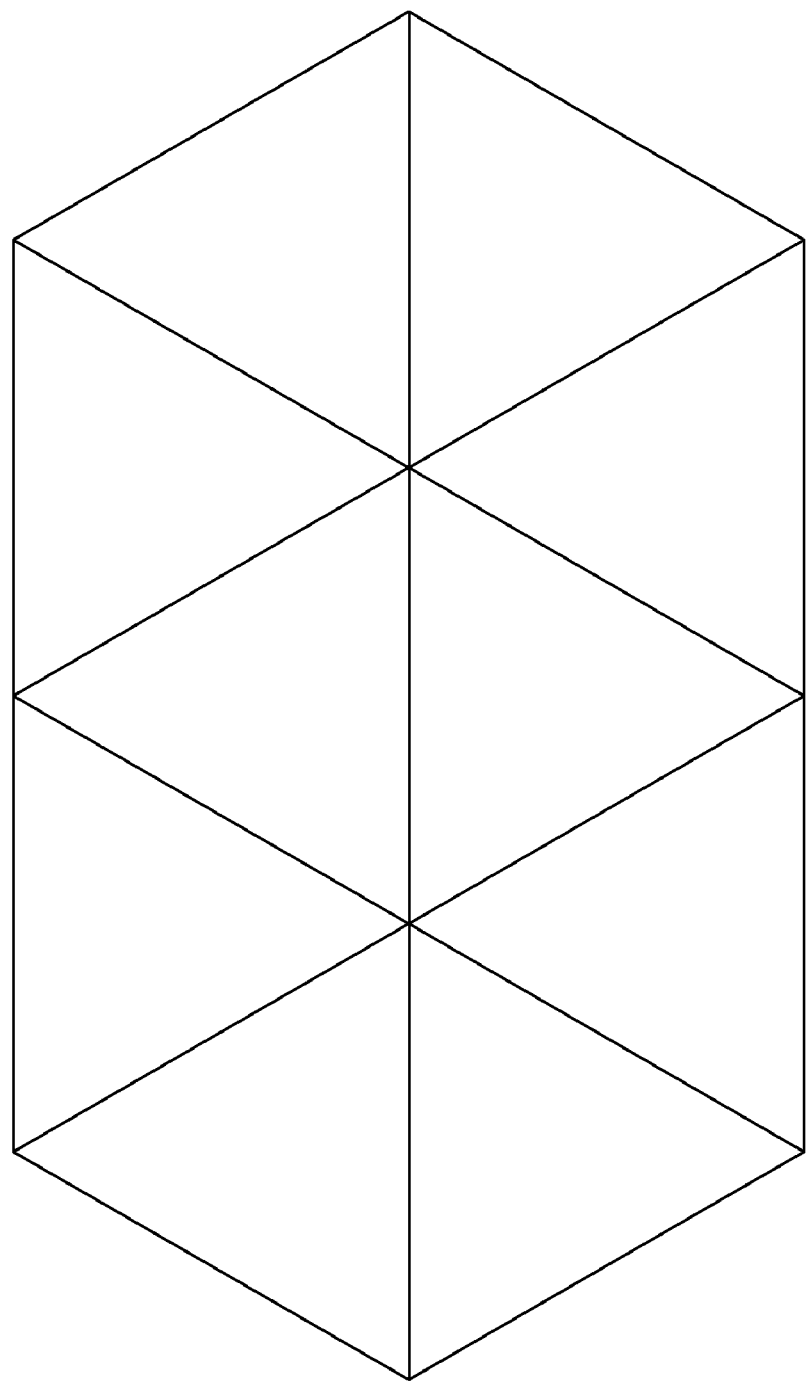
Figure 10:
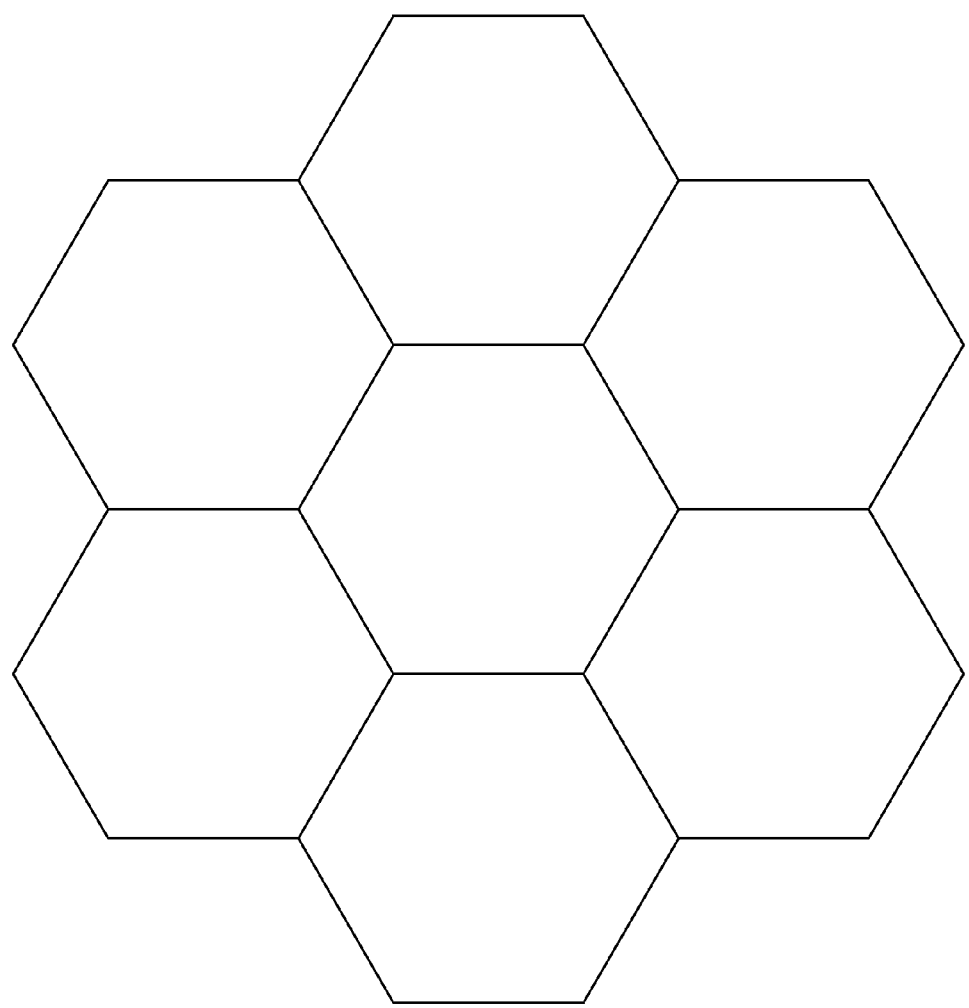
Figure 11:
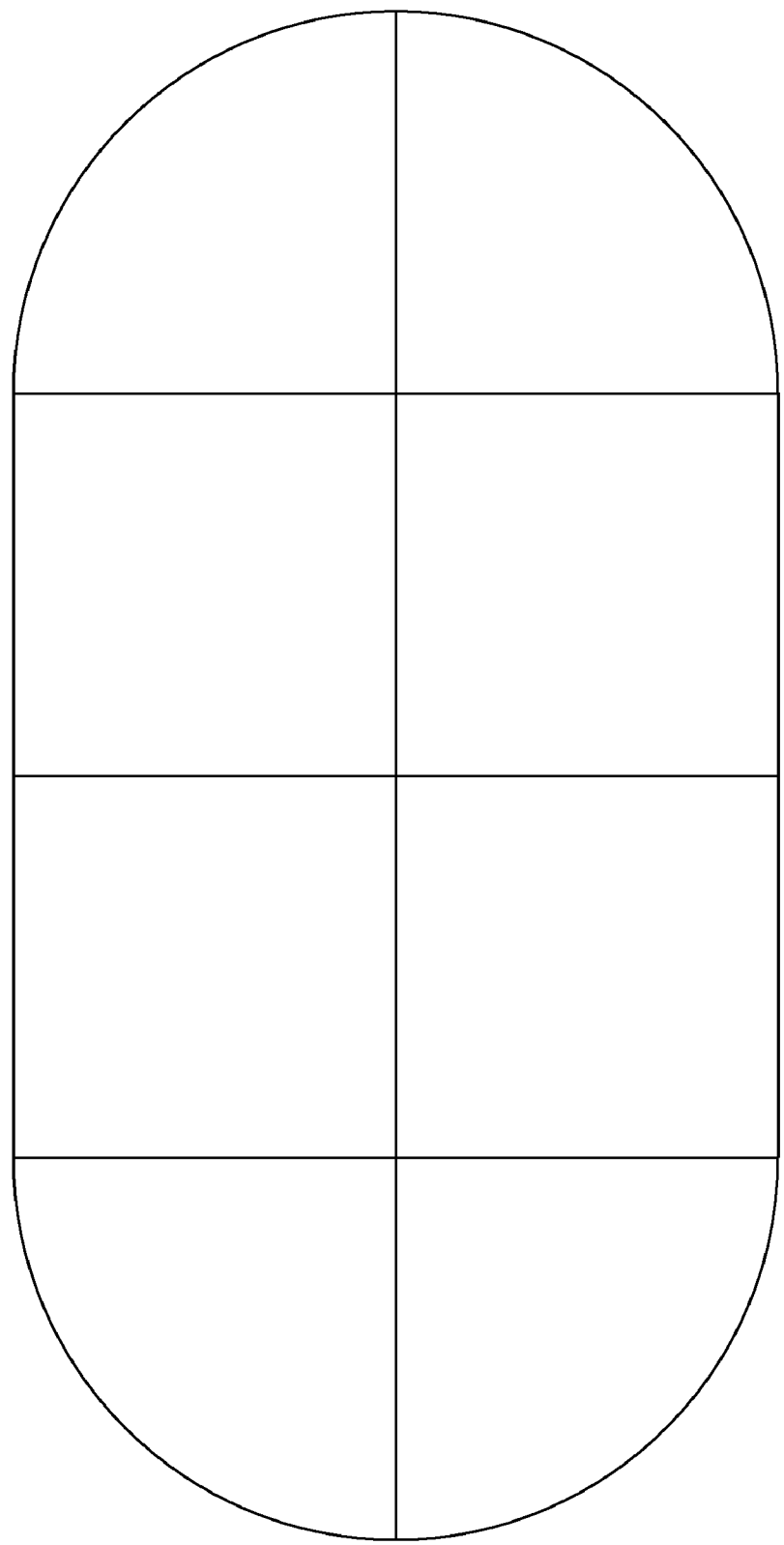

Referring to FIG. 7, a backlight module 300 which comprises a plurality of the illumination device 100 is shown. The illumination device 100 are joined together to form a large-sized backlight module 300 by joints formed between the joint surfaces 124 of the light guide blocks 120 of adjacent illumination device 100. The light exit surfaces 121 of the light guide blocks 120 are substantially coplanar and cooperatively constituted a light output surface of the backlight module 300. The size and shape of the backlight module 300 can be regulated via regulating the amount and shape of the illumination device 100 which composes the backlight module 300, so as to meet the size and shape requirement of the display without downgrading the uniformity. The present invention hence provides an efficient approach to meet the needs of display, more particularly to large-sized display, such as logo display board.

In the present backlight module 300, the illumination device 100 are joined with one another by a surface contact formed between the joint surfaces 124 of the adjacent light guide blocks 120. Alternatively, joint structures of the light guide blocks 120 can be joint lines, and accordingly, the light exit surface 121 can directly connect with the prism array 1224 of the tapered portion 122. Therefore, the light guide blocks 120 are joined together by a line contact formed between the joint lines of the adjacent light guide blocks 120. In this embodiment, the backlight module 300 comprises a plurality of rectangular shaped light guide blocks 120 and therefore has a rectangular shaped configuration.

Referring to FIGS. 8 through 11, other embodiments of the backlight module 300 are shown. In the embodiment shown in FIG. 8, the backlight module 300 comprises four quadrant light guide blocks 120 and therefore having a round shaped configuration. In the embodiment shown in FIG. 9, the backlight module 300 comprises ten triangular shaped light guide blocks 120. In the embodiment shown in FIG. 10, the backlight module 300 comprises seven hexagon-shaped light guide blocks 120 and therefore having a honeycomb shaped configuration. In the embodiment shown in FIG. 11, the backlight module 300 comprises four rectangular shaped light guide blocks 120 and four quadrant light guide blocks 120. Alternatively, the backlight module 300 may have other configurations so as to meet size and shape requirement of the display.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide block comprising:
   a polygonal light exit surface;
   an octagonal bottom surface opposite to the light exit surface with a receiving hole formed therein, the receiving hole being configured for receiving a light source therein; and
   a peripheral stepped side surface substantially interconnecting the light exit surface and the bottom surface, the light guide block generally tapering from the light exit surface to the bottom surface,
   wherein the peripheral stepped side surface comprises a plurality of first side surfaces and a plurality of second side surfaces, each of the first side surfaces defines a substantially isosceles trapezoidal shape, each of the second side surfaces defines a substantially isosceles trapezoidal main portion and a substantially triangular minor portion, the substantially isosceles trapezoidal shapes of the first side surfaces and the substantial isosceles trapezoidal main portions of the second side surfaces are alternately arranged around a center axis of the light guide block, and each substantially triangular minor portion extends from the long parallel side of the corresponding substantially isosceles trapezoidal main portion to a corresponding corner of the light exit surface.

2. The light guide block of claim 1, wherein the receiving hole is arranged on the center axis of the light guide block.

3. The light guide block of claim 2, wherein the peripheral stepped side surface forms a plurality of continuously connected prisms which are concentrically arranged around the center axis.

4. The light guide block of claim 1, wherein the light guide block is substantially multi-pyramidal in profile.

5. The light guide block of claim 1, wherein the light exit surface of the light guide block is substantially planar.

6. The light guide block of claim 1, wherein a thickness of the light guide block is approximately no more than 1 centimeter, whilst an area of the light exit surface of the light guide block is approximately no less than 10 times 10 square centimeters.

7. The light guide block of claim 1, wherein each of the first side surfaces defines a plurality of steps, and each of the main portions of the second side surfaces defines a same plurality of steps.

8. The light guide block of claim 7, wherein each step of each first side surface defines a prism portion, and each step of the main portion of each second side surface defines a prism portion.

9. The light guide block of claim 8, wherein opposite ends of each prism portion of each first side surface adjoin corresponding ends of two adjacent prism portions of the two adjacent main portions, respectively.

10. The light guide block of claim 9, wherein four corresponding prism portions of the first side surfaces and four corresponding prism portions of the main portions all adjoining one another end to end cooperatively form an octagonal ring-shaped prism.

11. The light guide block of claim 10, wherein successive of the octagonal ring-shaped prisms increase in size from the bottom surface to the light exit surface.

* * * * *